(12) United States Patent
Bhatti

(10) Patent No.: US 6,961,936 B2
(45) Date of Patent: Nov. 1, 2005

(54) APPARATUS AND METHOD FOR CONTROLLING STORED JOBS

(75) Inventor: Kristen L. Bhatti, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 842 days.

(21) Appl. No.: 09/957,300

(22) Filed: Sep. 20, 2001

(65) Prior Publication Data

US 2003/0065404 A1 Apr. 3, 2003

(51) Int. Cl.[7] ............................................. G06F 9/46
(52) U.S. Cl. ......................... 718/102; 347/7; 347/19; 358/1.14; 358/1.15; 709/203
(58) Field of Search ............................. 718/100, 102, 718/107; 347/7, 19; 358/1.14, 1.15, 3.23; 709/246; 715/517; 400/61

(56) References Cited

U.S. PATENT DOCUMENTS

| | | | |
|---|---|---|---|
| 5,617,528 A * | 4/1997 | Stechmann et al. | 715/517 |
| 6,474,881 B1 * | 11/2002 | Wanda | 400/61 |
| 6,633,395 B1 * | 10/2003 | Tuchitoi et al. | 358/1.14 |
| 6,832,263 B2 * | 12/2004 | Polizzi et al. | 709/246 |

* cited by examiner

Primary Examiner—Majid Banankhah

(57) ABSTRACT

An apparatus and method for controlling stored jobs, in a system of networked MFPs, includes an MFP with a printer for printing stored jobs. A storage device is connected to the printer for storing jobs. A user interface device is connected to the MFP with a printer for selecting job storage options wherein one of the options includes a job retention expiration date. Job retention expiration dates are individualized or selected from a default expiration selection group including 30, 60, 90, 180 days and never. Additionally, the user interface device further includes a date tracker connected to the network for keeping track of the current date. In a further aspect of the invention, the user interface device includes notices to the user of job retention expiration dates as occurring and automatic deletion of retained jobs on the selected expiration date.

16 Claims, 2 Drawing Sheets

```
@PJL SET RET=ON
@PJL SET DUPLEX=OFF
@PJL SET ECONOMODE=OFF
@PJL SET OUTBIN=UPPER
@PJL SET FINISH=NONE
@PJL SET PAGEPROTECT=AUTO
@PJL SET PAPER=LETTER
@PJL SET HOLD=STORE
@PJL SET USERNAME="UNTITLED"
@PJL SET JOBNAME="UNTITLED"
@PJL SET EXPDATE="06/30/01"
```

APPARATUS AND METHOD FOR CONTROLLING STORED JOBS

FIELD OF THE INVENTION

This invention relates to an apparatus and method for controlling stored jobs. In particular, in a system of networked multifunctional peripherals (MFPs), the invention relates to an apparatus and method for controlling stored jobs by means of an MFP including a printer with a user interface that includes a job retention expiration date option.

BACKGROUND OF THE INVENTION

A major difficulty in offices of businesses around the world is keeping track of the huge volumes of information that are produced each day. Typically, information falls into one of two basic categories. Information is either disposable immediately after creation or is required to be retained for some period of time after creation. Information that is to be retained is saved in a variety of manners known in the art. In fact, saving information has been made so easy that even information that is not necessary to be kept more than a short period of time ends up being saved much longer than necessary. The end result is that databases are typically full of unnecessary saved information.

A variety of methods have been adopted by businesses to deal with the problem of huge amounts of saved data. One method has been simply to add additional memory. When additional memory is cheap, this is a reasonable quick fix. Nonetheless, this "solution" simply postpones the day when the user must deal with an overloaded database full of ancient unneeded data.

Inevitably, a user is confronted with the reality that the only accurate way to deal with a database full of ancient data is to review each of the entries individually and determine which is to be kept and which is to be deleted. Understandably, this is not a task most individuals look forward to completing. As a result, it is often left undone to the detriment of the overall performance of the database and associated machinery.

It is typical that offices have more than one business machine involved in handling data. In fact, in today's environment, businesses usually have a network of multifunctional peripherals (MFPs). These machines, as the name suggests, are capable of accomplishing more than one business task. For example, these machines serve as printers, copiers, and the like, all of which are essentially fully functional computer systems and all of which include databases of one sort or another. As these machines continue to become more fully integrated with each other by means of intra and internets, the problem of data base overcrowding has mushroomed.

Further, job retention is a known printer feature that allows a user to store a print job at the printer either in memory or on a disk. Jobs can be reviewed and printed using the user interface at the printer control panel. Job retention types currently known are: Stored Job, Private Job, Quick Copy and Proof and Hold. Some of these known job retention types are stored until they are manually deleted, as discussed above, at the control panel and others are automatically deleted after they have been retrieved and printed, so that a user must take extraordinary steps to retain a job in the database for future use.

Thus, there is a need in the art for providing an apparatus and method that enables a user to control stored jobs in a manner that is easy, efficient and timely such that jobs that need to be retained are retained and those that need to be deleted are deleted at a time selected by the user.

SUMMARY OF THE INVENTION

Accordingly, in a system of networked MFPs, an apparatus for controlling stored jobs includes an MFP including a printer for printing stored jobs. A storage device is connected to the printer for storing jobs and a user interface device is connected to the MFP with a printer for selecting job storage options wherein one of the options includes a job retention expiration date.

In a further embodiment, the job retention expiration date includes a default expiration date selected from a group including 30, 60, 90, and 180 days. In a further aspect, the job retention expiration date is never. In a further aspect of the invention, the user interface device further includes a date tracker connected to the network for keeping track of the current date. In a related aspect of the invention, the date tracker is a connection to the Internet.

In a further embodiment, the user interface device includes notices to the user of job retention expiration dates as occurring. In another aspect of the invention, the user interface device includes notices to the user of job retention expiration dates as occurring and automatically deletes retained jobs on a selected expiration date.

In another preferred embodiment of the invention, in a system of networked MFPs, a method of controlling stored jobs includes the step of providing a MFP on the network with a printer for printing stored jobs. A storage device to is connected to the printer for storing print jobs. A user interface is connected to the MFP with a printer for selecting job storage options wherein one of the options includes a job retention expiration date. A job to be stored is added to the storage device and a job retention expiration date for the job to be stored is selected.

In a further aspect of the invention a default job retention expiration date is added to the user interface. In one aspect of the invention, the default job retention expiration date is selected from a group including 30, 60, 90, and 180 days. In a further aspect of the invention, the default job retention expiration date group includes never. In another aspect, the invention includes the steps of notifying the user of job retention expiration dates as occurring and subsequently automatically deleting retained jobs on the expiration date.

In another preferred embodiment of the invention, in a network of MFPs, a computer program product for controlling stored jobs includes instructions for printing stored jobs on a MFP with a printer, instructions for storing jobs on the MFP with the printer, and instructions for a user interface for the MFP with a printer for selecting job storage options wherein one of the options includes a job retention expiration date. In another aspect of the invention, the computer program product includes instructions for a job retention expiration default date.

DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE INVENTION

Figure 1:
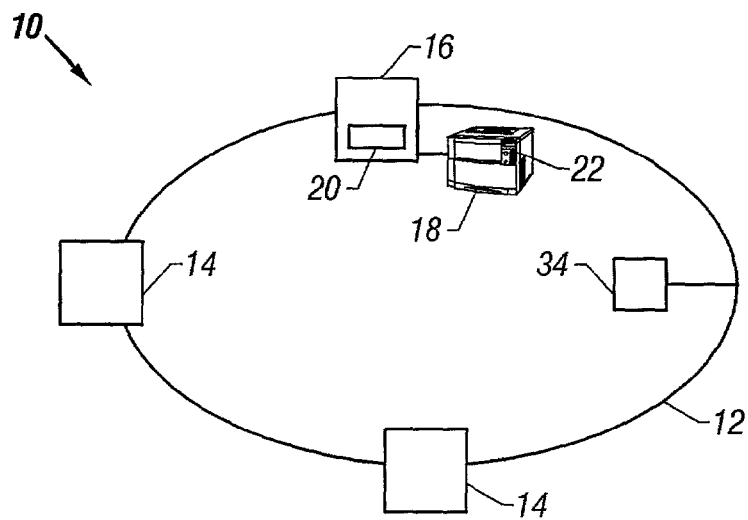
FIG. 1 is a schematic diagram of the apparatus for controlling stored jobs of the present invention.

The preferred embodiment of the present invention is illustrated by way of example in FIGS. 1–4. With reference to FIG. 1, the apparatus for controlling jobs 10 of the present invention includes network 12 and a plurality of networked MFPs 14. In addition to MFPs 14, MFP 16 includes a printer 18. Storage device 20 on MFP 16 is connected to printer 18 for storing jobs. User interface 22 is connected to MFP 16 and printer 18 and is used for selecting job storage options 24 wherein one of the options includes a job retention expiration date 26, as will be discussed more fully hereafter.

As just described, in its simplest form, apparatus for controlling jobs 10 includes the network 12 to which a plurality of MFPs 14 are connected. The network 12 may be any network now known or hereafter developed including an intra network or an internet network. Once again, MFPs 14 may be any type of business machine now known or hereafter developed wherein data is prepared, stored, transferred, manipulated or the like. Additionally, MFP 16 is described as being connected to printer 18 while obviously MFP 16 and printer 18 may be conformed as a single MFP in its own right. It is enough that MFP 16 is distinguished by the ability to provide printer like services in the form of the standard known printer 18.

Storage device 20 likewise may be physically located on MFP 16, printer 18, MFP 14 or remotely connected through network 12 at some other location. Those of ordinary skill in the art will appreciate that storage device 20 is any storage device now known or hereafter developed for retaining data. In particular, the data to which this invention is directed is stored "jobs". By jobs, it is meant any data that is created for a useful purpose and which a user desires to transmit in some additional form. Typically, the transmission is accomplished by printing a hard copy of the desired data on printer 18. Certainly electronic copies of the stored jobs are anticipated by the invention as well. In fact, any useful purpose for which the data may be needed in any form, hard copy, electronic copy, or the like, now known or hereafter developed is easily encompassed within the scope of the present invention.

Figure 2:
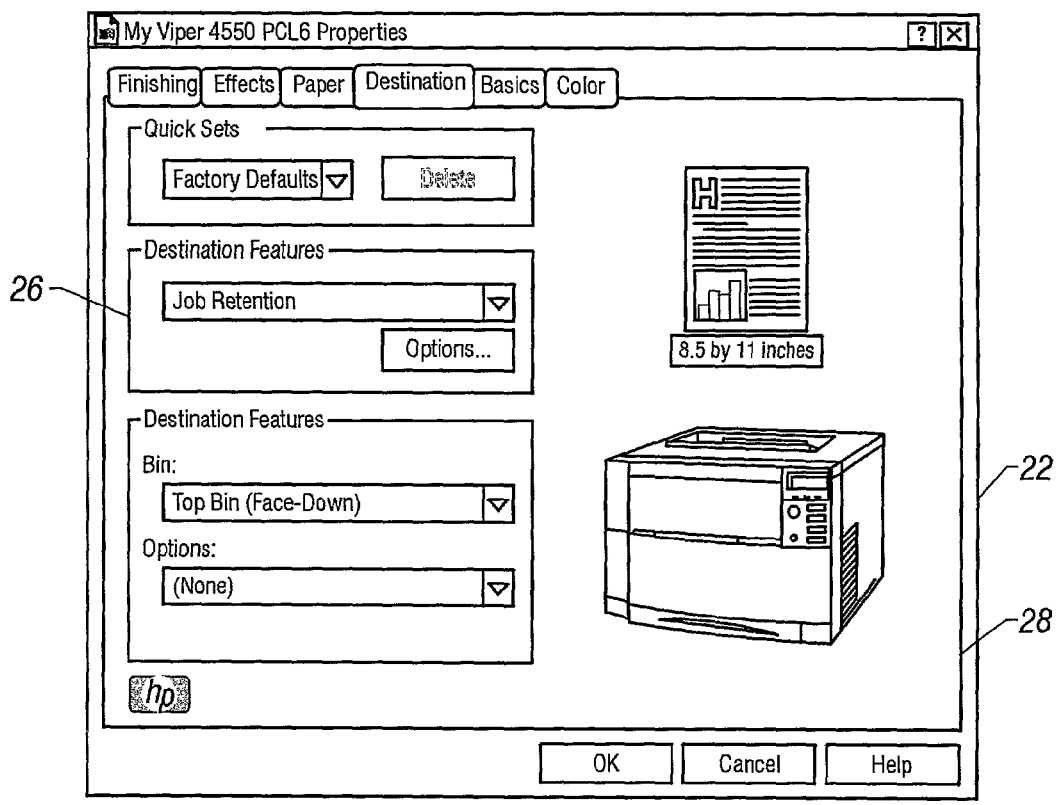
FIG. 2 is an illustration of the user interface of the invention wherein a user selects Job Retention as an option.
Figures 3, 4:
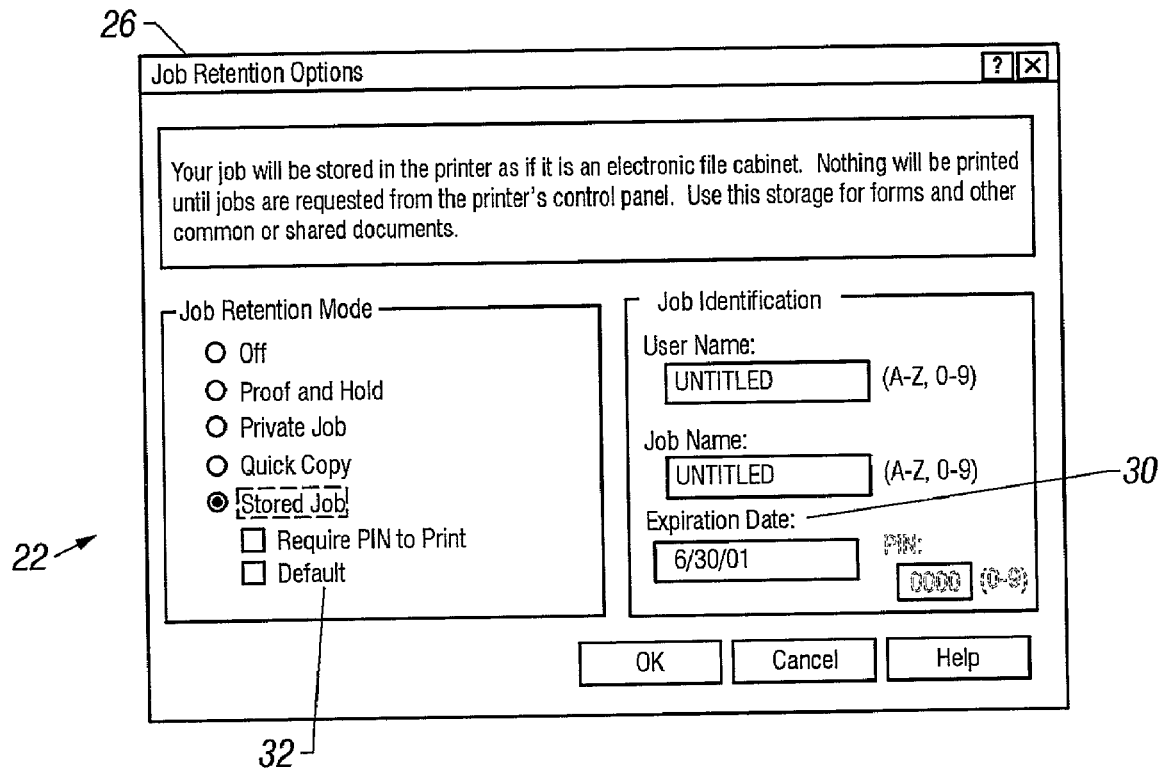
FIG. 3 is an illustration of the user interface of the invention wherein a user selects a variety of job retention options.
FIG. 4 is an illustration of an additional printer job list (PJL) command as included in the PJL wrapper.

A discussion of the user interface 22 of the invention is best accomplished by reference to FIGS. 2 and 3. Referring to FIG. 2, user interface 22 is illustrated. User interface 22 includes a typical interface screen 28 wherein a variety of job storage options 24 are provided. Again, as previously mentioned, known job storage options 24 include stored job, private job, quick copy and proof and hold options. By way of the present invention, however, an additional option in the form of job retention option 26 is provided. As illustrated in FIG. 2, job retention option 26 is displayed for the user's convenience in an obvious and easy-to-use manner. Certainly, any desired display may be utilized so long as it is intuitive and easy-to-use.

Referring now to FIG. 3, the user interface 22 of the present invention is disclosed as is presented a user who selects job retention option 26. In its basic form, apparatus for controlling jobs 10 includes the option for a user to select a job retention option 26 by means of inputting an expiration date 30 at this screen. As a result, the user need not concern his or herself with whether or not a job will be on automatically deleted when printed, as often happens in the art to date, or worry that the job will remain stored on the database way beyond any useful life and unnecessarily consume space in storage device 20.

In the preferred embodiment, job retention option 26 includes the option of selecting a default expiration date 32. That is to say, a user has the option to select a default expiration date 32 from a group of default expiration dates including 30, 60, 90, and 180 days. Additionally, a user has the option, in a preferred embodiment, of selecting a default expiration date 32 of never. Obviously, when "never" is selected the data can only be removed by other means such as manual deletion and the like.

In a preferred embodiment, apparatus for controlling jobs 10 includes a date tracker 34 for keeping track of the current date. The MFPs known in the art are kept time aware by a variety of means including, in a preferred embodiment, connecting MFPs 14 and 16 to the Internet. Certainly, any other means of providing accurate date tracking services to the MFP 16 and printer 18 such that job retention options 26 may be implemented on time, is appropriate.

Referring now to FIG. 4, by means of the present invention, when a driver sends the job to the printer 18, an additional PJL command for the expiration date 30 is included in the PJL wrapper. As illustrated, the new command required by the apparatus for controlling jobs 10 of the present invention is command 36 "set expdate" for "set expiration date". As illustrated, a user has selected "Jun. 30, 2001" as a desired expiration date for this particular job. Assuming that the date when the command 36 was entered was prior to Jun. $30^{th}$, 2001, once that date is reached, the job will be automatically deleted on that date in accordance with the apparatus for controlling jobs 10 of the present invention.

In another preferred embodiment of the invention, user interface 22 includes notices to the user of job retention expiration dates 30 and 32 as occurring. This may be done by any means now known or hereafter developed including messages at user interface 22 itself, e-mail messages to a user's computer, printouts and the like. Additionally, in a preferred embodiment, user interface 22 includes notices to the user of job retention expiration dates 30 and 32 as occurring and thereafter automatically deletes retained jobs on the occurrence of a selected expiration date. In either case, the user has the option to renew the job storage options 24 and select a new expiration date 30 or a new default expiration date 32 or allow the automatic deletion of the stored job as planned.

In operation, a user of the apparatus for controlling jobs 10 establishes a network 12 of MFPs 14 and at least one MFP 16 connected to printer 18. MFP 16 and/or printer 18 includes storage device 20 and user interface 22. Once assembled, a user utilizes MFPs 14 and 16 as is known in the art. When the user desires to retain a job for a time certain, the user accesses job storage options 24 at user interface 22. At job storage option 24, the user is provided with a job retention option 26. The user then may select an expiration date 30 or a default expiration date 32 as desired. Additionally, in a preferred embodiment, one of the expiration dates 30 is never. In any event, date tracker 34 ensures that upon the occurrence of the expiration date 30 and/or the default expiration date 32, the identified job is automatically deleted. In a preferred embodiment, notice to a user of jobs to be deleted is provided.

In a further preferred embodiment, a computer program product for controlling stored jobs includes instructions for printing stored jobs on MFP 16 with printer 18. Further, instructions for storing jobs in storage device 20 are included and instructions for providing a user interface 22 with MFP 16 and printer 18 includes instructions for selecting job storage options 24 wherein one of the options includes a job retention expiration date 30.

The description of the present embodiment of the invention has been presented for purposes of illustration but is not intended to be exhaustive or to limit the invention to the form disclosed. Many modifications or variations will be apparent to those of ordinary skill in the art. As such, while the present invention has been disclosed in connection with the preferred embodiments thereof, it should be understood that there may be other embodiments which fall within the spirit and scope of the invention as defined by the following claims.

What is claimed is:

1. In a system of networked MFPs, an apparatus for controlling stored jobs comprising:
    a) an MFP including a printer for printing stored jobs;
    b) a storage device connected to said printer for storing jobs; and
    c) a user interface device connected to said MFP with a printer for selecting job storage options wherein said options include a job retention expiration date, a default expiration date, an expiration date of never, and a notice to the user of an expiration date with the option to revise said expiration date.

2. The apparatus of claim 1 wherein said job retention expiration date includes a default expiration date selected from a group including 30, 60, 90, and 180 days.

3. The apparatus of claim 1 wherein said user interface device further includes a date tracker connected to the network for keeping track of the current date.

4. The apparatus of claim 3 wherein said date tracker is a connection to the Internet.

5. The apparatus of claim 1 wherein said user interface device includes notices to the user of job retention expiration dates as occurring.

6. The apparatus of claim 1 wherein said user interface device includes notices to the user of job retention expiration dates as occurring and automatic deletion of retained jobs on a selected expiration date.

7. In a printer, an apparatus for controlling stored jobs comprising:
    a) a printer with a storage device for storing print jobs at the printer;
    b) a printer control panel for accessing stored print jobs connected to said printer;
    c) a job retention means connected to said printer control panel for setting a job retention expiration date wherein said job retention expiration date setting includes: a job retention expiration date, a default expiration date, an expiration date of never, and a notice to the user of an expiration date with the option to revise said expiration date; and
    d) a clock means for keeping track of the current date connected to said job retention means.

8. The apparatus of claim 7 wherein said job retention means automatically deletes a particular stored job on the occurrence of the job retention expiration date for said particular job.

9. The apparatus of claim 7 wherein said clock means for keeping track of the current date is a connection to the Internet.

10. The apparatus of claim 7 wherein said job retention means lists stored jobs to be deleted on or before the job retention expiration date.

11. In a system of networked MFPs, a method of controlling stored jobs comprising the steps of:
    a) providing a MFP on the network with a printer for printing stored jobs;
    b) connecting a storage device to said printer for storing print jobs;
    c) connecting a user interface to said MFP with a printer for selecting job storage options wherein said options include a job retention expiration date, a default job retention expiration date, an expiration date of never, and a notice to the user of an expiration date with the option to revise said expiration date;
    d) adding a job to be stored to the storage device and selecting a job retention expiration date for said job to be stored.

12. The method of claim 11 wherein the default job retention expiration date is selected from a group including 30, 60, 90, and 180 days.

13. The method of claim 11 further comprising the steps of notifying the user of job retention expiration dates as occurring and subsequently automatically deleting retained jobs on the expiration date.

14. In a network of MFPs, a computer program product for controlling stored jobs, the computer program product comprising:
    a) instructions for printing stored jobs on a MFP with a printer;
    b) instructions for storing jobs on said MFP with said printer; and
    c) instructions for a user interface for said MFP with a printer for selecting job storage options wherein said options include a job retention expiration date, a default expiration date, an expiration date of never, and a notice to the user of an expiration date with the option to revise said expiration date.

15. The computer program product of claim 14 wherein said default expiration date instructions include instructions for a default date selected from a group including 30, 60, 90, and 180 days.

16. The computer program product of claim 14 further comprising instructions for notifying a user of job retention expiration dates as occurring and for automatically deleting retained jobs after notification.

* * * * *